(12) United States Patent
Akita (10) Patent No.: US 7,601,064 B2
(45) Date of Patent: Oct. 13, 2009

(54) GAME APPARATUS, GAME METHOD, AND PROGRAM

(75) Inventor: Manabu Akita, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 901 days.

(21) Appl. No.: 10/799,452

(22) Filed: Mar. 12, 2004

(65) Prior Publication Data

US 2004/0198492 A1   Oct. 7, 2004

(30) Foreign Application Priority Data

Mar. 13, 2003  (JP) ............................. 2003-067828

(51) Int. Cl.
*A63F 9/24* (2006.01)
(52) U.S. Cl. .............................. 463/30; 463/6; 463/27
(58) Field of Classification Search .................. 463/6, 463/30, 37
See application file for complete search history.

(56) References Cited

U.S. PATENT DOCUMENTS

| | | | |
|---|---|---|---|
| 4,817,948 A * | 4/1989 | Simonelli | 463/6 |
| 4,949,119 A | 8/1990 | Moncrief et al. | |
| 5,197,003 A | 3/1993 | Moncrief et al. | |
| 5,749,268 A | 5/1998 | Nishimura | |
| 6,030,291 A | 2/2000 | Maki et al. | |
| 6,353,427 B1 | 3/2002 | Rosenberg | |
| 6,422,941 B1 * | 7/2002 | Thorner et al. | 463/30 |

FOREIGN PATENT DOCUMENTS

| | | |
|---|---|---|
| JP | 07-124332 | 5/1995 |
| JP | 07-213740 | 8/1995 |
| JP | 10-307633 | 11/1998 |
| JP | 2001-187268 | 7/2001 |
| JP | 2002-202820 | 7/2002 |

OTHER PUBLICATIONS

Supplementary European Search Report for Application No. 04720174.4, PCT/JP2004003296, dated Apr. 7, 2008, 3 pages total.

* cited by examiner

*Primary Examiner*—Corbett B Coburn
(74) *Attorney, Agent, or Firm*—Townsend and Townsend and Crew LLP (57) ABSTRACT

A connection unit of a game apparatus can be communicably connected to a "controller which has a lever that can be moved along a predetermined route, and which sends status information specifying a position of the lever and receives instruction information specifying a repulsive force to be applied to the lever". A storage unit pre-stores repulsive force information specifying a repulsive force to be applied to the lever, in association with a game status and the position of the lever. A reception unit receives status information from the controller via the connection unit. A generation unit acquires repulsive force information pre-stored in association with the current game status and the position of the lever specified by the received status information, and generates instruction information specifying a repulsive force specified by the acquired repulsive force information. A sending unit sends the generated instruction information to the controller via the connection unit.

6 Claims, 7 Drawing Sheets

GAME APPARATUS, GAME METHOD, AND PROGRAM

BACKGROUND OF THE INVENTION

1. Field of the Invention

The present invention relates to a game apparatus and game method for controlling a repulsive force against a lever by using information regarding the position of the lever, and a program for realizing these on a computer.

2. Description of the Related Art

There has conventionally been provided a racing game where a player as a vehicle driver drives a vehicle, moves around in a virtual world in the vehicle, and enjoys a competition with other players or players controlled by a computer.

In such a racing game, a player determines the direction in which the vehicle advances by operating a controller shaped like a steering wheel, issues instructions for acceleration and deceleration by operating controllers shaped like an accelerator and a brake, and adjusts a virtual gear rate of the vehicle by operating a controller shaped like a gearlever.

In such a racing game, when the player moves the controller, as the gearlever having a bar shape by his/her hand, a switch related to the gearlever is shifted or the position of the gearlever is detected by an optical sensor, thereby a signal representing the position of the gearlever is output.

On the other hand, in a real vehicle, forces felt by the driver when he/she shifts the gearlever change in accordance with the condition of the vehicle, such as engine rotation number, engine output, temperature, etc. That is, even if the driver tries to change to a gear rate that does not match the engine rotation number, the driver may not be able to shift the gearlever to the intended position because he/she receives a repulsive force. Further, in this case, strange noises happen. On the contrary, if the driver tries to change to a gear rate that does match the engine rotation number, the gearlever can be smoothly moved, and in many cases the caused noises are quiet. The driver can know the condition of the vehicle by such reactions of the gearlever.

Accordingly, there is a demand for a technique for allowing the game player to know the conditions of the vehicle, the acceleration condition of the vehicle, etc. in the virtual world, by changing the repulsive force felt when the player operates the gearlever in accordance with the progress status of the game and the current position of the gearlever. Particularly, real-timeness is required in a game, and calculations necessary for such control on the gearlever need therefore be performed as fast as possible.

SUMMARY OF THE INVENTION

The present invention was made for solving the above-described problem, and an object of the present invention is to provide a game apparatus and game method suitable for making it possible to give a player the same operational touch as felt when operating the gearlever of a real vehicle, and a program for realizing these on a computer.

To achieve the above object, the following invention will be disclosed in accordance with the principle of the present invention.

A game apparatus according to a first aspect of the present invention comprises a connection unit, a storage unit, a reception unit, a generation unit, and a sending unit, which are structured as follows.

The connection unit can be communicably connected to a "controller which has a lever that can be moved along a predetermined route, and which sends status information specifying a current position of the lever and receives instruction information specifying a repulsive force to be applied to the lever". The gear rate of an ordinary vehicle can be changed by shifting a gearlever to positions such as low, second, third, top, etc. Other than these, there is a position called "rear" for changing the gear rate in a manner reverse to the low, second, third, top positions, etc. It is necessary to pass through a position called "neutral" in order to shift from one position to another position among the those positions.

It is preferred that the controller connected to the present game apparatus be an imitation of such a gearlever of a real vehicle as described above. The controller sends information indicating the current position of a lever to the present game apparatus as status information. On the other hand, the present game apparatus sends instruction information specifying a repulsive force to be applied to the lever to the controller.

The storage unit pre-stores repulsive force information specifying a repulsive force to be applied to the lever, in association with a game status and a position of the lever.

For example, if the gearlever of a real vehicle is shifted without the clutch pedal being stepped on, a large repulsive force is caused. Accordingly, in a case where the driver tries to shift the gearlever forcibly, he/she has to apply a large force.

On the contrary, if the gearlever is shifted to the neutral position with the clutch pedal stepped on, the repulsive force is small. Therefore, the driver needs only to apply a small force to the gearlever.

Further, when the clutch is let in, vibration corresponding to this move is often caused to the gearlever. This vibration also corresponds to a repulsive force to the gearlever.

Various such data on a real vehicle is collected and edited to prepare such an operational touch as described above felt when shifting the gearlever as repulsive force information with respect to the positions of the gearlever, and stored in the storage unit. The reception unit receives status information from the controller via the connection unit. The received status information specifies information representing the position of the lever.

The generation unit acquires the repulsive force information pre-stored in association with a current game status and a position of the lever specified by the received status information, and generates instruction information specifying a repulsive force specified by the acquired repulsive force information. The rotation number of the engine of a virtual vehicle moving in the game and controlled by the player, temperature, pressure, velocity of the vehicle, condition of the clutch, etc. can be considered as the current game status.

The sending unit sends the instruction information generated by the generation unit to the controller via the connection unit. Upon receiving the instruction information, the controller acts to apply the repulsive force specified by the instruction information to the gearlever.

By the present invention, it is possible to give the player operating the gearlever-shaped controller connected to the present game apparatus, the same operational touch as the touch of operating the gearlever of a real vehicle. In the present game apparatus, the generation unit may designate as the instruction information, a value obtained by heightening or lowering the repulsive force specified by the acquired repulsive force information in a predetermined cycle or randomly. That is, the pre-stored repulsive force corresponds to the average value of the repulsive forces to be felt by the player. The heightening or lowering range, the cycle, and characteristics of a random number of this case may be changed in accordance with the game status and the position of the lever.

By the present invention, it is possible to give the game player, reactions imitating the vibration of the engine and gearlever which is felt by the driver of a real vehicle from the gearlever.

The game apparatus of the present invention further comprises a calculation unit and a display unit which may be structured as follows.

The storage unit further pre-stores driving force information specifying a driving force, in association with a game status and a position of the lever. As described above, the game status includes information such as rotation number and output of the engine of the vehicle, temperature, pressure, etc. The driving force for moving the vehicle is prepared in association with the game status, and the position of the lever (i.e. a selected gear rate).

The calculation unit calculates the acceleration of the object moving in a virtual world, based on a driving force specified by the driving force information pre-stored in association with the current game status and the position of the lever specified by the received status information. Specifically, the acceleration of the vehicle in a racing game can be obtained by subtracting the frictional force of the road and the braking force of the brake from the acquired driving force, and dividing the subtraction result by the mass of the vehicle.

The display unit moves the object in the virtual world at the calculated acceleration, and displays the object on a screen at a position reached by the moving. For example, in a case where the movement of the object in the virtual world is two-dimensional, the object is displayed at a position of the object obtained by time integration, upon the display of the scenery of the virtual world. Accordingly, by applying the present invention, it is possible to allow the player to see how the object moves.

In the game apparatus of the present invention, the display unit may display on the screen, the virtual world as viewed from the position of the object reached by the moving. In this case, a three-dimensional graphic image of the virtual world constituted by various polygons, as viewed from the object is displayed on the screen.

For example, in a case where the present invention is applied to a racing game, it is possible to make the player feel as if he/she drove a vehicle and viewed an external world such as a racing circuit, etc.

The game apparatus of the present invention further comprises an audio unit. In this case, the storage unit may further pre-store audio information in association with a game status and a position of a lever, and the audio unit may reproduce audio information pre-stored in association with the current game status and the position of the lever specified by the received status information.

For example, it is possible to cause a sound differently, in a case where the gearlever is shifted from the neutral position to a position of a gear rate that matches the current engine rotation number arid load, and in a case where the gearlever is shifted from the neutral position to a position of a gear rate that does not match. Accordingly, by applying the present invention, it is possible to make the player hear the same sound as that caused when operating a real gearlever, and thereby give the player a realer operational touch.

A game method according to another aspect of the present invention comprises a receiving step, a generating step, and a sending step, and is intended for communications with a "controller which has a lever that can be moved along a predetermined route, and which sends status information specifying a current position of the lever and receives instruction information specifying a repulsive force to be applied to the lever".

In the receiving step, status information is received from the controller.

In the generating step, repulsive force information which is pre-stored in association with a current game status and a position of a lever specified by the received status information is acquired, and instruction information specifying a repulsive force specified by the acquired repulsive force information is generated.

In the sending step, the generated instruction information is sent to the controller.

A program according to a yet another aspect of the present invention is for controlling a computer, having a connection unit communicably connected to a "controller which has a lever that can be moved along a predetermined route, and which sends status information specifying a current position of the lever and an external force and receives instruction information", to function as the above-described game apparatus, or for controlling the computer to execute the above-described game method.

The program of the present invention can be stored on a computer-readable information recording medium such as a compact disk, a flexible disk, a hard disk, a magneto-optical disk, a digital video disk, a magnetic tape, a semiconductor memory, etc. This program can be distributed or sold through a computer communication network, separately from a computer for executing this program. Further, the information recording medium can be distributed or sold separately from a computer.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

An embodiment of the present invention will now be explained below. An embodiment where the present invention is applied to an information processing apparatus for games only will be explained below for easier understanding. However, the present invention can likewise be applied to information processing apparatuses such as PDAs (Personal Data Assistants), cellular phones, and various other computers. That is, the embodiment to be explained below is intended for illustration and not intended for limiting the scope of the present invention. Accordingly, even if a person skilled in the art can employ an embodiment Wherein some or all of the components of the embodiment of the present invention are replaced with equivalents of those, such an embodiment will be regarded to be included in the scope of the present invention.

The Embodiment of the Invention

Figure 1:
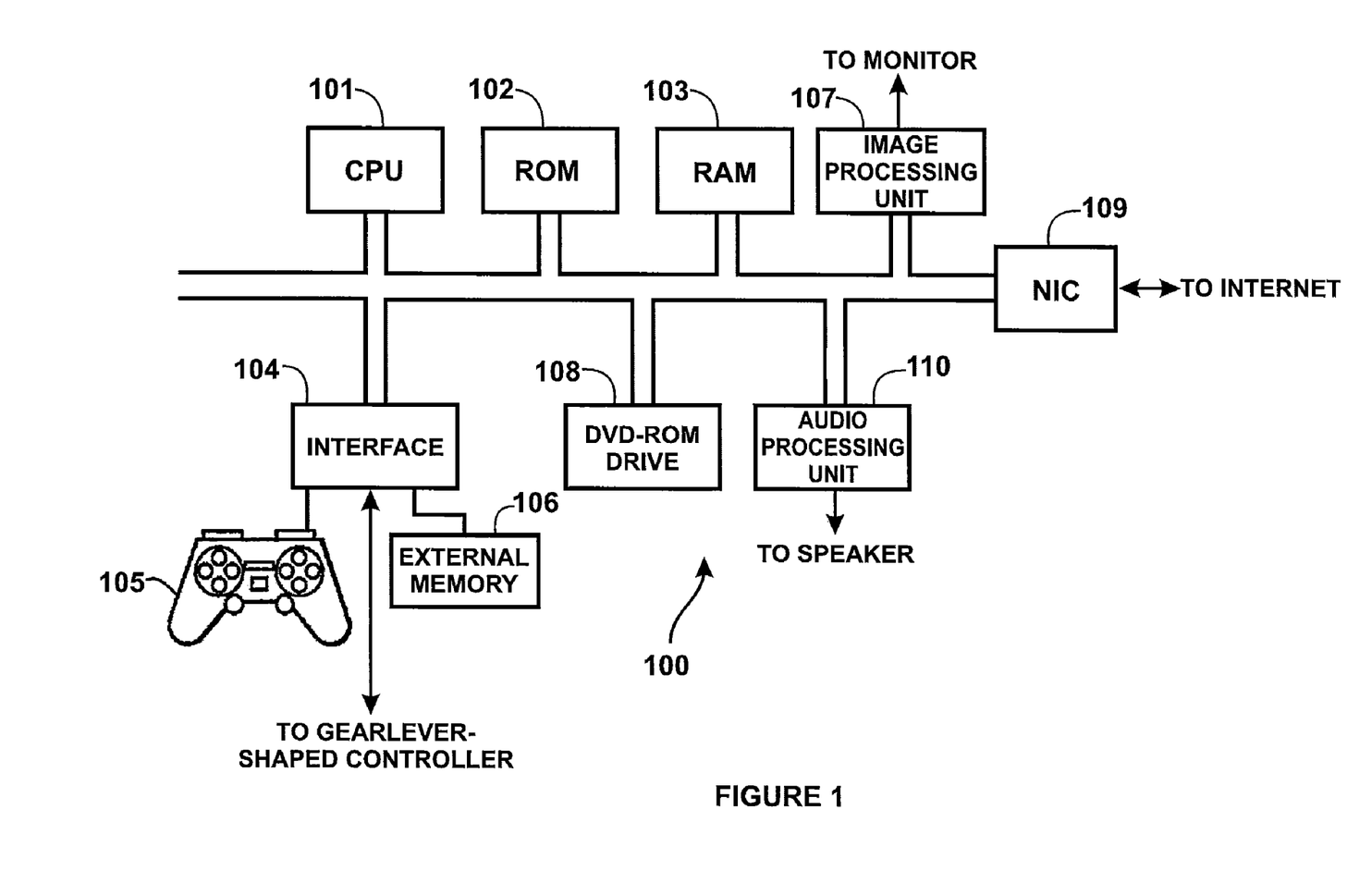
FIG. 1 is an exemplary diagram showing a schematic structure of a typical information processing apparatus by which a game apparatus according to an embodiment of the present invention is realized.

FIG. 1 is an exemplary diagram showing a schematic structure of a typical information processing apparatus by which a game apparatus according to an embodiment of the present invention is realized. The following explanation will be made with reference to FIG. 1.

An information processing apparatus 100 comprises a CPU (Central Processing Unit) 101, a ROM (Read Only Memory) 102, a RAM (Random Access Memory) 103, an interface 104, a controller 105, an external memory 106, an image processing unit 107, a DVD (Digital Versatile Disk) -ROM drive 108, an NIC (Network Interface Card) 109, and an audio processing unit 110.

The game apparatus according to the present embodiment is realized by installing a DVD-ROM storing a program and data for a game on the DVD-ROM drive 108 and switching on the information processing apparatus 100 to execute the program.

The CPU 101 controls the entire operation of the information processing apparatus 100, and is connected to each component and transmits control signals and data therewith. The CPU 101 receives data from each component, processes the received data by various calculations and supplies the processed data to each component as data or control signals. In the CPU 101, various data are once stored in a cache of the CPU 101 and then acquired by a register of the CPU 101, and thereafter applied various calculations such as four arithmetic calculations, bit calculations, logic calculations, etc.

In the ROM 102, an IPL (Initial Program Loader) to be executed immediately after the power is on is stored, execution of which causes the program stored in the DVD-ROM to be read into the RAM 103 and executed by the CPU 101. In the ROM 102, program and various data for an operating system necessary for controlling the entire operation of the information processing apparatus 100 are also stored.

The RAM 103 is for temporarily storing data and programs. A program and data read from the DVD-ROM and other data necessary for progression of the game or communications are stored in the RAM 103. Other than these, various information transmitted from devices connected to the information processing apparatus 100 such as a later-described gearlever-shaped controller, etc., and information to be transmitted to the devices are temporarily stored in the RAM 103.

Figure 2:
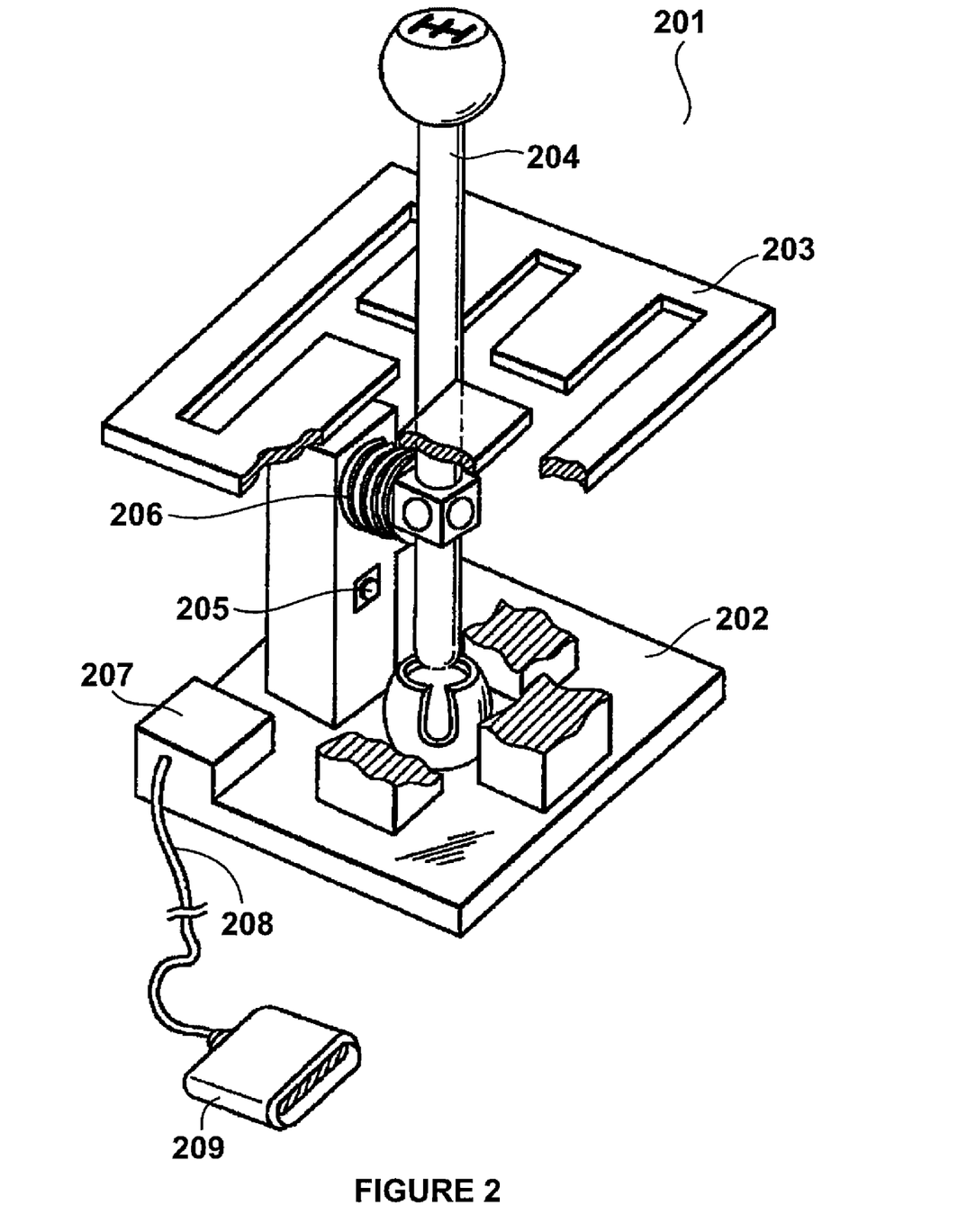
FIG. 2 is an exemplary diagram showing a schematic structure of a gearlever-shaped controller connectable to the game apparatus according to the embodiment of the present invention.

The controller 105 connected to the information processing apparatus 100 via the interface 104 receives operational inputs entered by a user when playing the game. A gearlever-shaped controller can also be connected to the interface 104. FIG. 2 is an exemplary diagram showing one schematic structure of the embodiment of such a gearlever-shaped controller. The following explanation will be made with reference to FIG. 2.

The gearlever-shaped controller 201 according to the present embodiment is roughly separated into a base portion 202, a guide portion 203, a lever portion 204, a sensor portion 205, and force application portions 206.

The base portion 202 forms a base for putting the gearlever-shaped controller 201 on a floor. In FIG. 2, the base portion 202 and the guide portion 203 are shown as separate members. However, there actually is a member connecting both of them. That is, the both are structured as a box shape where the base portion 202 is the bottom and the guide portion 203 is the ceiling.

In a racing game play, the player usually pours much power when he/she gets excited. Therefore, the gearlever-shaped controller 201 must have weight heavy enough In a racing game play, the player usually pours much power when he/she gets excited. Therefore, the gearlever-shaped controller 201 must have weight heavy enough not to fall down or slide even when it is treated a bit roughly. Or, the entire gearlever-shaped controller 201 needs to be fixed to the floor by providing the bottom of the base portion 202 with a sucker or other such members.

The lever portion 204 having a bar shape has its one end connected to the base portion 202 by a universal joint and penetrates through a groove of the guide portion 203. Therefore, when the player operates the lever portion 204, the player has to move the lever portion 204 along the groove of the guide portion 203. According to the present embodiment, the groove is formed into the shape shown in FIG.2. The vertical bar of this shape corresponds to "neutral", and the vertexes correspond to "low", "second", "Third", "top" "over top", and "rear", respectively.

The sensor portion 205 irradiates a light beam onto a reflector of the lever portion 204, and detects the posture of the lever portion 204 by the reflected light. The lever portion 204 moves along the groove of the guide portion 203 on the universal joint as a fulcrum. Therefore, if it is possible to represent by two inclination parameters in which direction the lever portion 204 is inclined, the position of the lever portion 204 when it is seen as a gearlever can be known.

Various other embodiments can be employed as the sensor unit 205. One such embodiment may be that the lever portion 204 and the external wall of the box shape (the box shape including the base portion 202 and the guide portion 203) are connected by springs. When in a free state, the lever portion 204 is structured such that it automatically comes to the center of the neutral position (the center of the shape). The inclination of the lever portion 204 is detected by sensing the force applied to the springs by a force sensor or a distortion gauge.

Another embodiment may be that the lever portion 204 and the base portion 202 are connected not by the universal joint but by a flexible body that can be bent in an arbitrary direction. A distortion gauge is attached to this flexible body, and the posture of the lever portion 204 is detected by the distortion gauge. This is the same structure as an analog joystick which is widely used as a controller for game apparatuses.

In the gearlever-shaped controller 201, four of the force application portions 206 are provided around the lever portion 204, such that they can apply reverse forces to the lever portion 204 in the vertical direction and horizontal direction with respect to the shape. Therefore, external forces such as a pushing force and a pulling force can be applied to the lever portion 204 from around. It is also possible not to allow the force application portions 206 to apply any forces to the lever portion 204 (so that the lever portion 204 can change its posture freely) by issuing an appropriate instruction signal to the force application portions 206.

Various forces such as a magnetic force caused by using a solenoid, etc. can be used other than an oil pressure, an air pressure, etc. as the forces to be applied by the force application portions 206. In order to apply an oil pressure and an air pressure, the force application portions 206 have a built-in pump and a built-in electromagnet. The forces to be applied to the lever portion 204 are adjusted by increasing or decreasing the electricity to be applied to the pump and electromagnet.

The sensor portion 205 senses how the lever portion 204 is moved. Accordingly, the position, moving velocity, moving angle acceleration, acceleration, and angle acceleration of the lever portion 204 can be obtained from the output of the sensor portion 205. Based on these information pieces and a repulsive force applied by each force application portion 206 (known from the electricity supplied to the pump and electromagnet), the external force applied by the player to the lever portion 204 can be calculated backwards.

That is, the force applied by each force application portion 206 to the lever portion 204 is a repulsive force against the external force applied by the player to the lever portion 204. When the lever portion 204 stands still, the external force and its repulsive force have the same magnitude and are reverse to each other (law of action and reaction).

In addition to the above-described portions, the gearlever-shaped controller 201 comprises an interface 207 for connecting to the information processing apparatus 100, a cable 208 to be connected to the interface 207, and a connector 209 for connecting to the interface 104 of the information processing apparatus 100. Through these portions, status information specifying the current position (posture and angle) of the lever portion 204 and an external force is sent to the information processing apparatus 100, and through these portions instruction information specifying the repulsive force of the lever portion 204 is received from the information processing apparatus 100.

Since data transmission in the unit of bytes or in the unit of words is suitable for communications with the gearlever-shaped controller 201, the following value conversion is performed.

Figure 3:
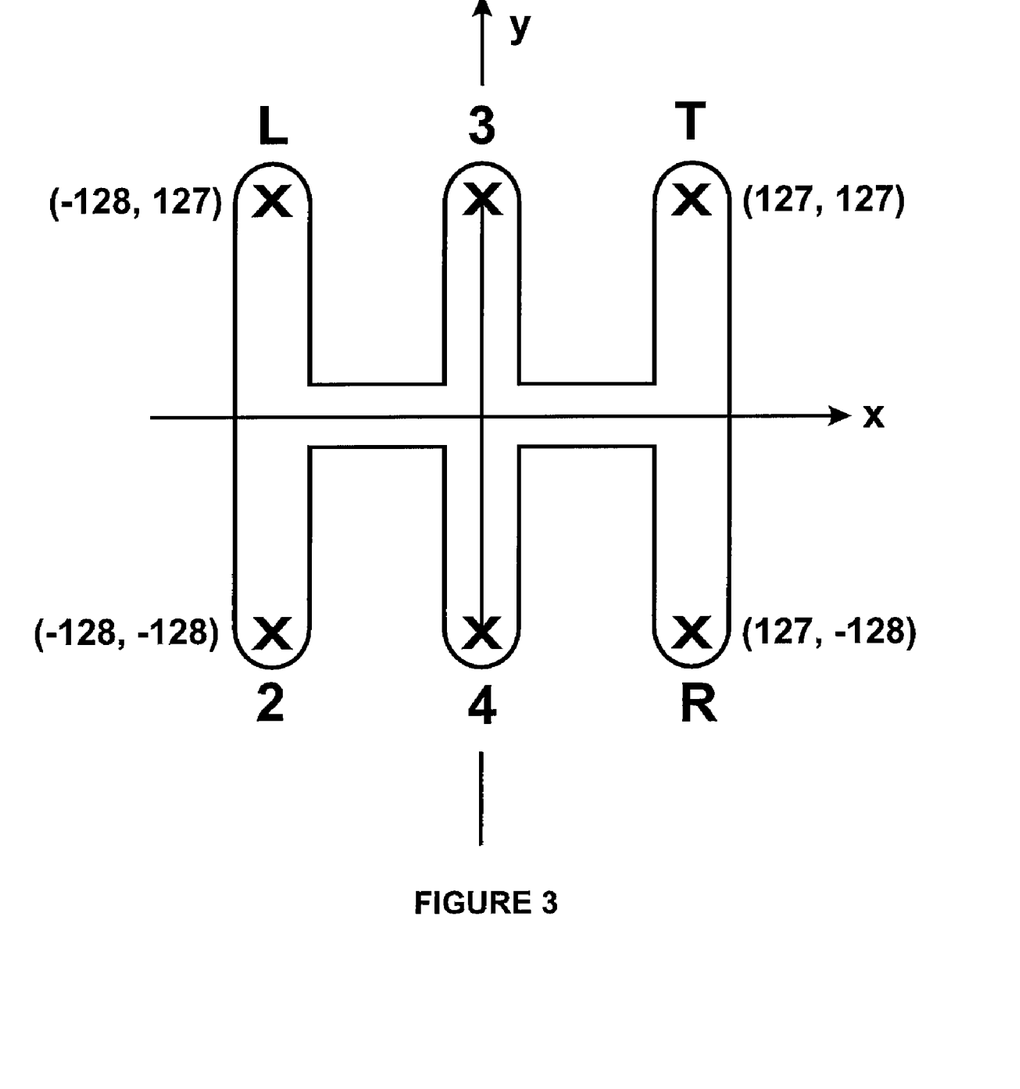
FIG. 3 is an explanatory diagram showing a coordinate system representing positions of a lever of the gearlever-shaped controller.

First, the position of the lever portion 204 is expressed by appropriately converting an output from the sensor portion 205 to correspond to a coordinate system shown in FIG. 3. According to the correspondence manner shown in FIG. 3, the center of the neutral position corresponds to (0, 0), the directions in which the gearlever can move freely in the neutral state correspond to the horizontal axis, and the directions in which the gearlever is moved to be set to each gear rate correspond to the vertical axis. Coordinate values are represented by integers of one byte.(−128 to 127). In this case, the position of the lever portion 204 is represented by two-byte data.

L (low)—coordinates (−128, 127)
2 (second)—coordinates (−128, −128)
3 (third)—coordinates (0, 127)
4 (top)—coordinates (0, −128)
T (over top)—coordinates (127, 127)
R (rear)—coordinates (127, −128)
Neutral—coordinates (−128, 0) to (127, 0)

Next, the force to be applied to the lever portion 204 by the four force application portions 206 in cooperation is specified as a vector representation made up of a pair of signed integers in accordance with the coordinate system of the shape. Hereinafter, each vector component is represented by an integer of two bytes (−32768 to 32767). If (0, −32768) is specified as a repulsive force in a case where the gearlever is positioned at (−128, 1) to (−128, 127), a reaction for making the player feel that it is hard to shift the gearlever to the low position can be expressed.

When the information processing apparatus 100 notifies the gearlever-shaped controller 201 of such a vector representation of a repulsive force as described above, the gearlever-shaped controller 201 appropriately converts the values of electricity, a current, and a voltage to be supplied to each of the four force application portions 206 and reacts in response to the conversion.

Returning to FIG. 1, the external memory 106 detachably connected via the interface 104 rewritably stores data representing a progressing status of a game. By performing an instruction input via the controller 105, the user can store such data in the external memory 106 in accordance with his/her necessity.

A DVD-ROM to be installed in the DVD-ROM drive 108 stores a program for realizing a game, and image data and audio data accompanying the program. Under the control of the CPU 101, the DVD-ROM drive 108 performs a reading process on the DVD-ROM installed thereon to read a necessary program and necessary data. The read program and data are temporarily stored in the RAM 103, etc.

The image processing unit 107 processes the data read from the DVD-ROM by an image calculation processor (not shown) comprised in the CPU 101 or the image processing unit 107, and after this, stores the processed data in a frame memory (not shown) comprised in the image processing unit 107. Image information stored in the frame memory is converted into a video signal at a predetermined synchronization timing and output to a monitor (not shown) connected to the image processing unit 107. Due to this, image display in various manners is available.

The image calculation processor can perform a calculation for superposing a two-dimensional image, a transparency calculation such as α blending, and various saturation calculations at a high speed. Further, the image calculation processor can perform at a high speed, a calculation for rendering by a Z-buffering method, polygon information which is arranged in a virtual three-dimensional space and to which various texture information pieces are attached to obtain a rendering image in which the polygon arranged in the virtual three-dimensional space is overlooked from a predetermined viewing position. Particularly, the image calculation processor has as a library or hardware, a function for calculating the degree to which the polygon is irradiated by a typical (positive) light source such as a dot light source, a parallel light source, a conic light source, etc., and can therefore perform such a calculation at a high speed.

Further, by cooperation of the CPU 101 and the image calculation processor, a letter string can be depicted in a frame memory or on a polygon surface as a two-dimensional image in accordance with font information defining the shape of letters. The font information is stored in the ROM 102. However, dedicated font information stored in the DVD-ROM may also be used.

The NIC 109 is for connecting the information processing apparatus 100 to a computer communication network (not shown) such as the Internet, etc. The NIC 109 is constituted by a modem meeting the 10BASE-T/100BASE-T standard used for building a LAN (Local Area Network), or an analog modem, ISDN (Integrated Services Digital Network) modem, and ADSL (Asymmetric Digital Subscriber Line) modem for connecting to the Internet using a telephone line, or a cable mode for connecting to the Internet using a cable television line, or the like and an interface (not shown) for intermediating between the modem and the CPU 101.

The audio processing unit 110 converts audio data read from the DVD-ROM into an analog audio signal, and causes the analog audio signal to be output from a speaker (not shown) connected to the audio processing unit 110. Further, under the control of the CPU 101, the audio processing unit 110 generates sound effects and music data that should be sounded during the progress of the game, and causes audios corresponding to the sound effects and music data to be output from the speaker. Sound effects and music data include, for example, a running noise of a vehicle, a vibration sound, a noise caused when a tire is locked, an abnormal noise caused when the gearlever is shifted to an unmatched gear rate, a sound caused when the clutch is let in, etc.

The information processing apparatus 100 may use a large capacity external storage device to allow the large capacity external storage device to perform the functions of the ROM 102, the RAM 103, the external memory 106, the DVD-ROM installed on the DVD-ROM drive 108, etc.

(Schematic Structure of the Game Apparatus)

Figure 4:
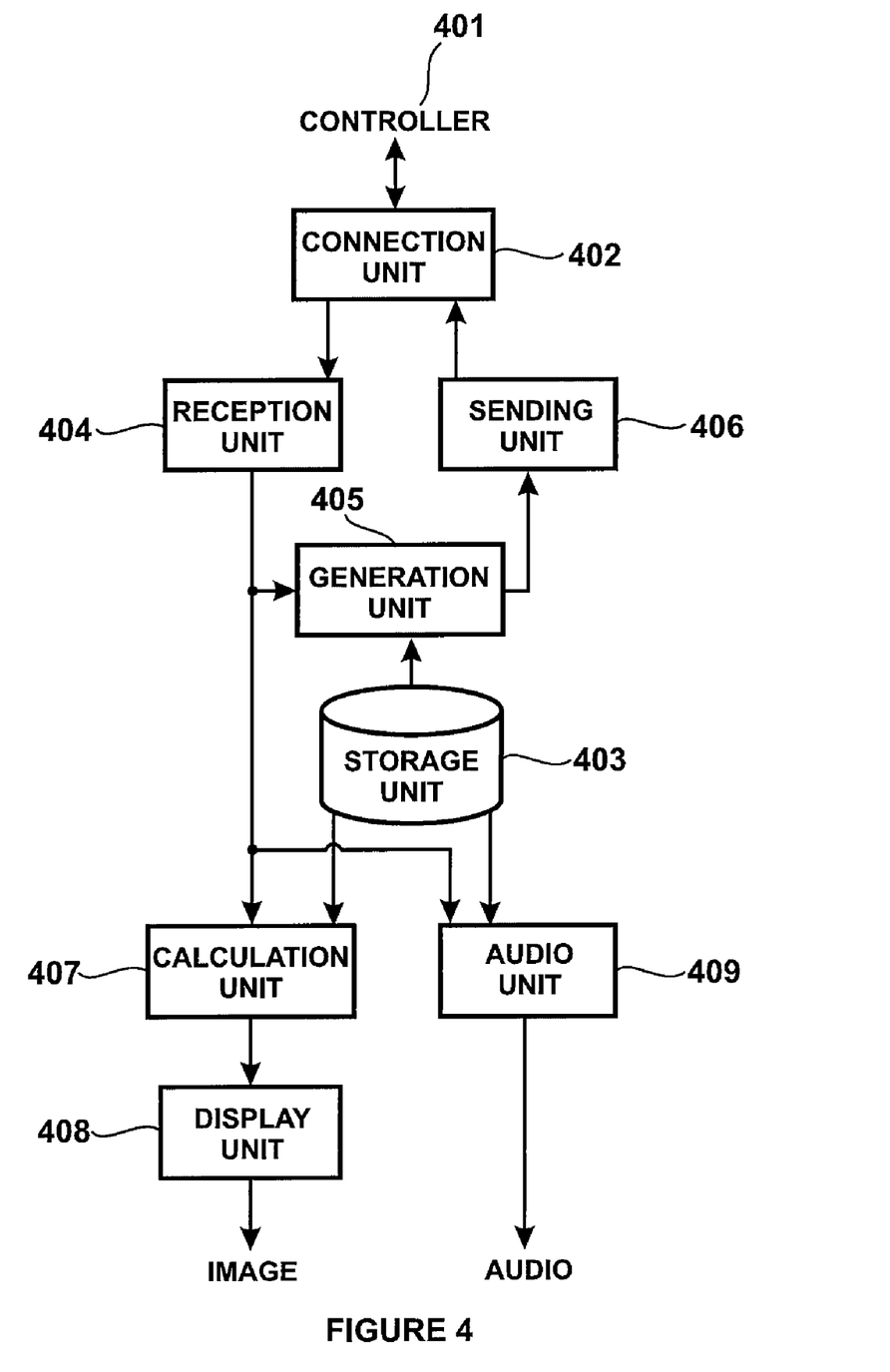
FIG. 4 is an exemplary diagram showing a schematic structure of the game apparatus according to the embodiment of the present invention.
Figure 5:
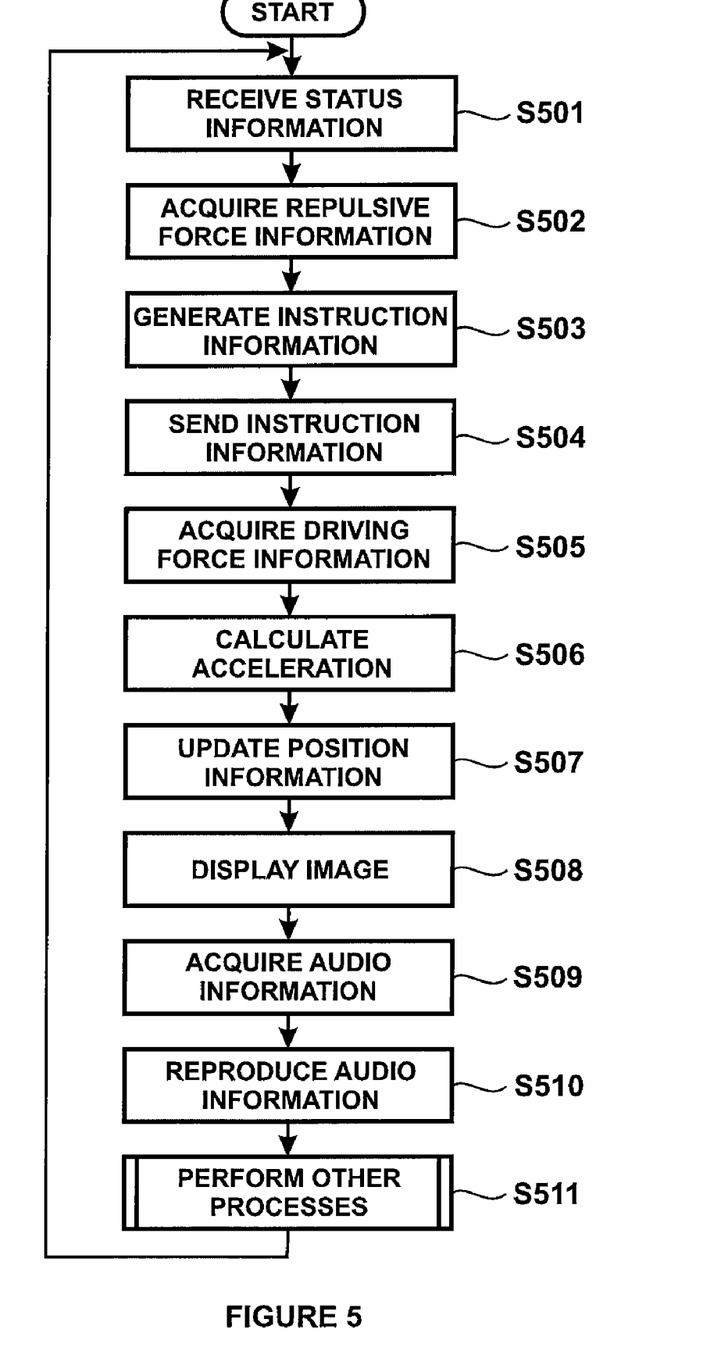
FIG. 5 is a flowchart showing a flow of processes of a game method executed by the game apparatus according to the embodiment of the present invention.

FIG. 4 is an explanatory diagram showing the schematic structure of each function of the game apparatus according to the present embodiment. FIG. 5 is a flowchart showing the flow of the process of a game method realized by the game apparatus according to the present embodiment. The following explanation will be made with reference to FIG. 4 and FIG. 5.

The game apparatus 401 according to the present embodiment comprises a connection unit 402, a storage unit 403, a reception unit 404, a generation unit 405, a sending unit 406, a calculation unit 407, a display unit 408, and an audio unit 409, and is structured as described below.

The connection unit 402 can be communicably connected to a "controller which has a lever that can be moved along a predetermined route, and which sends status information specifying the current position of the lever and receives instruction information specifying a repulsive force to be applied to the lever". That is, since the interface 104 of the information processing apparatus 100 is connected to the gearlever-shaped controller 201, the interface 104 functions as the connection unit 402.

The storage unit 403 pre-stores repulsive force information specifying repulsive forces to be applied to the lever in association with the statuses of the game and the positions of the lever. Accordingly, the DVD-ROM to be installed on the DVD-ROM drive 108, the RAM 103 which stores data read from the DVD-ROM, etc. function as the storage unit 403.

Figure 6:
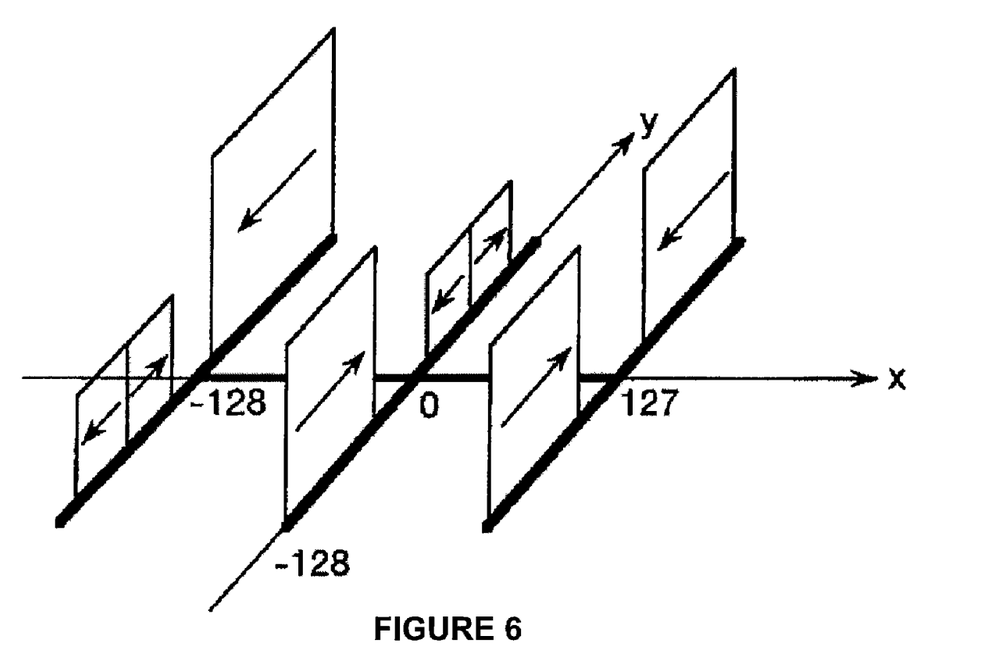
FIG. 6 is an explanatory diagram showing an outline of repulsive force information stored in a storage unit.
Figure 7:
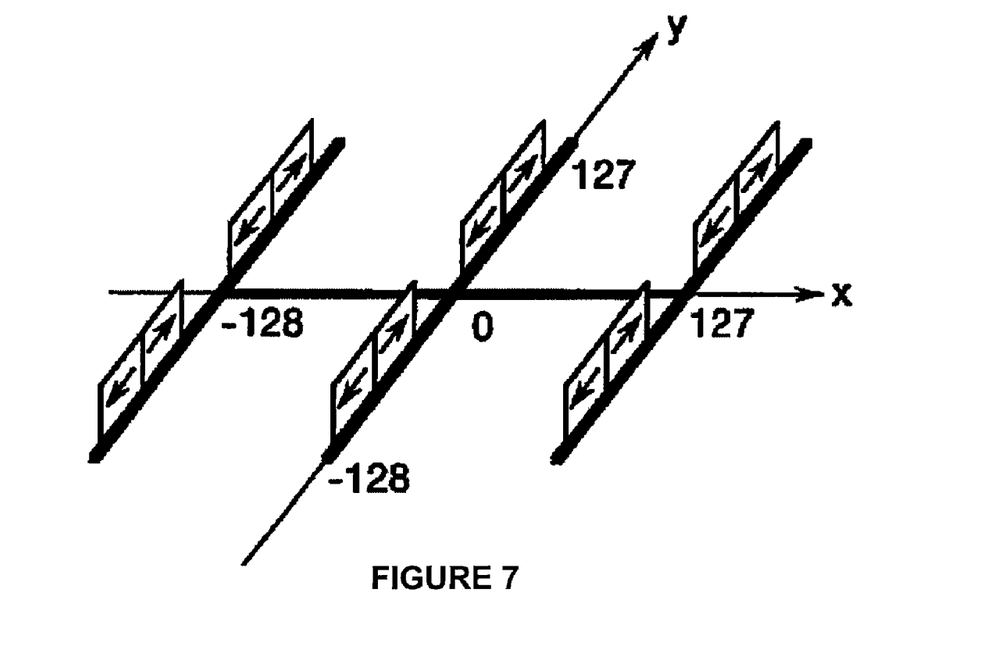
FIG. 7 is an explanatory diagram showing an outline of repulsive force information stored in a storage unit.

FIG. 6 and FIG. 7 are explanatory diagrams showing the position of the lever, the level of the repulsive force to be applied to the lever, and the direction of the repulsive force to be applied to the lever in a given game status.

FIG. 6 three-dimensionally shows the position of the lever and the level of the. repulsive force. The direction of the repulsive force is shown by arrows in FIG. 6. FIG. 6 shows a case where the vehicle gains some speed and the gear rate should therefore be shifted from the second to the third, and the clutch is not released.

The repulsive force is small near the second since the lever is already put in the second, but a repulsive force is caused if the player tries to shift the lever to the neutral without releasing the clutch. If the lever is continuously moved without releasing the clutch and then if a certain limit is exceeded, a force in such a direction as to draw the lever to the neutral is caused. This also happens in case of the third gear.

Further, even if the player tries to shift the lever to the low, top, over top, and rear, a repulsive force for letting the lever toward the neutral is caused. On the other hand, once the lever is shifted to the neutral without releasing the clutch, the lever can freely move in the neutral range, however is hard to shift to each gear rate.

FIG. 7 shows the same situation as shown by FIG. 6, except that the clutch is released. When the clutch is released, the player can easily shift to any gear rate. However, once the lever is moved to the end of each gear rate, the player feels a reaction when trying to move the lever to other positions.

With this distribution, when the player tries to shift the lever from the second to the neutral by releasing the clutch, a small repulsive force is generated at first. However, when the player shifts the lever to some position, the lever automatically moves to the neutral. This also happens when the lever is shifted to the neutral to the third.

In the situation shown in FIG. 7, the lever can be shifted to the rear position. Here, if the game situation changes and the clutch is let in, the distribution of repulsive forces returns to that shown in FIG. 6. Then, a repulsive force for moving the lever to the neutral is applied to the lever which has been shifted to the rear.

The game apparatus of the present invention is designed such that the same operational touch as felt in a real vehicle can be obtained by setting the levels and directions of repulsive forces in accordance with statuses of the game. Basic data about repulsive forces can be obtained by measuring repulsive forces applied to the gearlever by putting a real vehicle in various statuses. In case of a racing game, the followings can be considered as statuses of the game.

(a) Weight of the vehicle
(b) Friction coefficient of the road
(c) Air resistance coefficient
(d) Velocity of the vehicle
(f) Rotation number of the engine
(g) Degree of stepping on the brake These data are data on a vehicle running in a simulative world. However, by setting the data based on data acquired when the same phenomena happen to a real vehicle, a realer touch of operating the gearlever can be obtained.

Returning to FIG. 4 and FIG. 5, a process after the game method according to the present embodiment is started by the game apparatus 401 having such data prepared, will be explained. First, the reception unit 404 receives status information from the controller via the connection unit 402 (step S501). The received status information specifies information representing the position of the lever. Accordingly, the CPU 101 function as the reception unit 404 in cooperation with the interface 104.

The generation unit 405 acquires the pre-stored repulsive force information that is associated with the current game status and the position of the lever specified by the received status information (step S502). As described above, if the game status and the current position of the lever are determined, the level and direction (or a two-dimensional vector representation for the level and direction) of the repulsive force can be acquired from the storage unit 403.

Then, the generation unit 405 generates instruction information specifying a repulsive force designated by the acquired level and direction (step S503). In a case where the above-described data format is employed, the instruction information is represented by a four-byte value corresponding to a two-dimensional vector representing the level and direction of the repulsive force. Accordingly, the CPU 101 functions as the generation unit 405 in cooperation with the RAM 103, etc.

A value acquired from the storage device 403 may not be directly specified as the value of the repulsive force. However, a manner in which the level of the repulsive force is heightened or lowered cyclically or by generating a random number and then instruction information is generated, may be employed.

Generally, a phenomenon is observed that the gearlever of a vehicle vibrates in a predetermined vibration number unique to the gearlever because the vehicle resonates with the rotation of the engine. By minutely heightening or lowering the repulsive force by such a unique vibration number, the vibration of the gearlever in a real vehicle can be reproduced.

Further, a manner in which the heightening or lowering degree is determined not by vibration as described above but by a random number may be employed. In this case, not vibration in a unique vibration number, but random vibration is transmitted to the player.

Further, the unique vibration number may be changed, a manner in which a random number is generated may be changed, or the heightening or lowering range may be changed in accordance with the game status.

In the case where these manners are employed, the value acquired from the storage unit 403 has a meaning as the average value of the repulsive force specified by the repulsive force information.

The sending unit 406 sends the generated instruction information to the controller via the connection unit 402 (step S504). Accordingly, the CPU 101 function as the sending unit 406 in cooperation with the interface 104.

Upon reception of the instruction information, the gearlever-shaped controller 201 controls the repulsive force to be applied to the lever portion 204 by the specified value. In this manner, the same operational touch as the touch of operating the gearlever of a real vehicle can be given to the player who operates the gearlever-shaped controller connected to the game apparatus.

The calculation unit 407 acquires driving force information specifying a driving force associated with the current game status and the position of the lever specified by the received status information, by referring to the storage unit 403 (step S505).

The storage unit 403 further pre-stores driving force information specifying driving forces in association with game statuses and positions of the lever. Particularly, the position of the gearlever and the rotation number of the engine are closely related with each other. Therefore, unless a suitable gear rate is selected, a so-called "engine stop" is caused and the driving force downs to zero. If an engine stop is not caused, the driving force is changed by the gear rate (the position of the gearlever). Hence, by preparing such driving force information likewise the repulsive force information, vehicle driving is simulated.

The calculation unit 407 calculates the acceleration of an object moving in the simulative world based on the acquired driving force (step S506). Specifically, by subtracting a frictional force of the road and a braking force of the brake from the acquired driving force and dividing the subtraction result by the mass of the vehicle, the acceleration of the vehicle in the racing game can be obtained. Accordingly, the CPU 101 functions as the calculation unit 407.

The display unit 408 moves the object in the simulative world at the calculated acceleration (step S507), and displays the object on a screen at a position reached by the moving (step S508). Accordingly, the CPU 101 functions as the display unit 408 in cooperation with the image processing unit 107.

Figure 8:
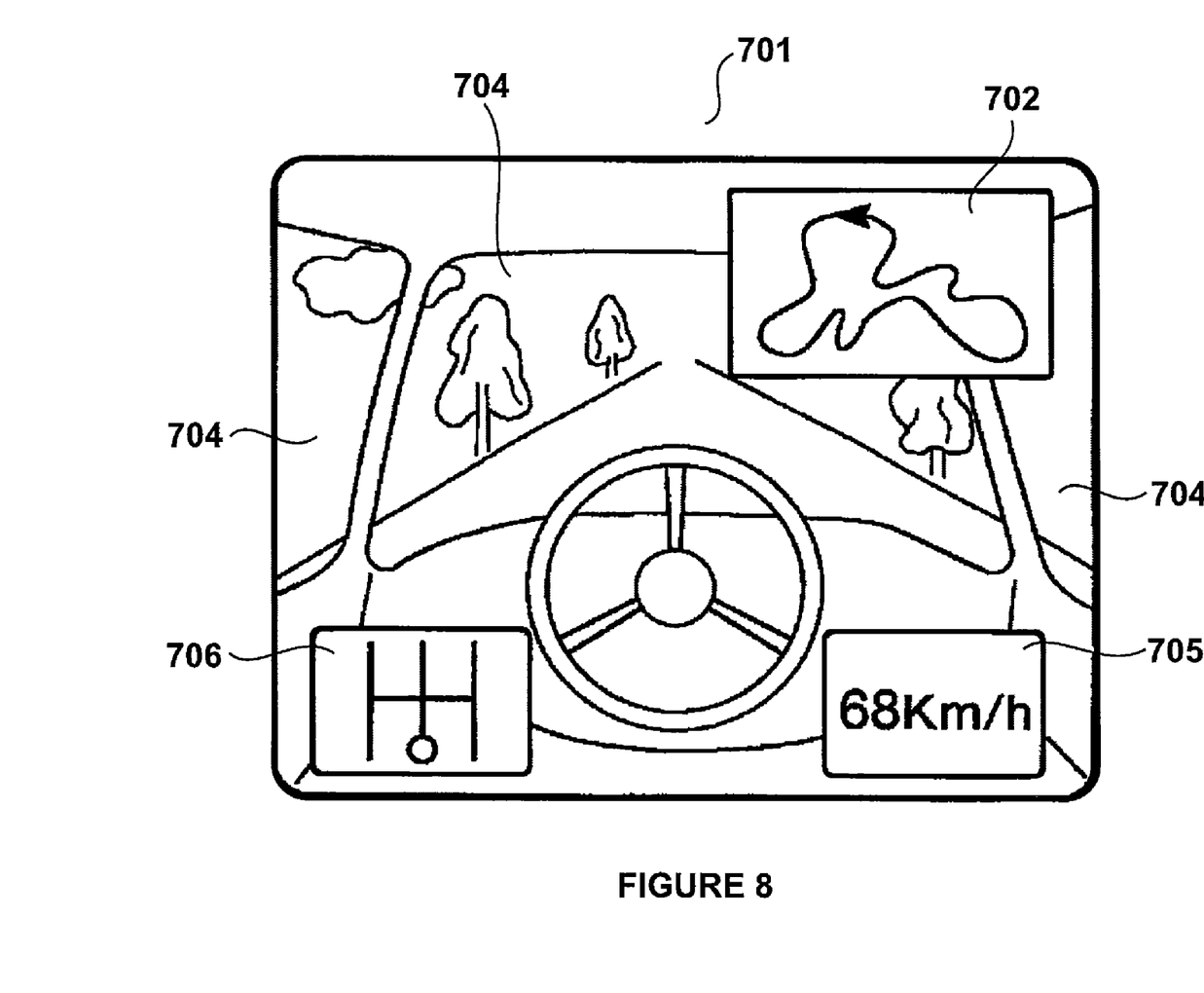
FIG. 8 is an explanatory diagram showing one example of a screen display of a racing game.

FIG. 8 is an explanatory diagram showing one example of a screen display of such a racing game. The following explanation will be made with reference to FIG. 8.

On a screen 701, map information 702 indicating the position of the vehicle in a course is displayed in an overlaid manner on a background 703 showing how an external world 704 looks from the driver's seat of the vehicle. The map information 702 two-dimensionally illustrates the shape of a course which is pre-set in the simulative world and the position of the vehicle in this course. By viewing this, the player can know where in the course the vehicle driven by him/herself is.

The background 703 shows how the external world 704 looks when it is seen from the driver's seat of the vehicle. The external world 704 is a three-dimensional graphic bird's-eye view of the road in the course and various objects provided around the road in the simulative world, wherein the road and the various objects provided around the road are constituted by polygons and the polygons are viewed with the position of the vehicle set as the viewpoint and preferably with the velocity of the vehicle set as the viewing direction. As described above, various techniques can be applied to image generation by such three-dimensional graphics.

Other than the above, on the screen 701, a speedometer 705 indicating the velocity of the vehicle and a lever indicator 706 indicating the current position of the gearlever are displayed. For such value indication, different colors may be assigned to respective ranges of values, so that the display color may be changed as the value increases. Value indication is provided to the player by using numerals on the screen 701. However, value indication may be provided by using a bar graph, a pie graph, or a meter graph as employed in a real vehicle.

The audio unit 409 acquires audio information which is pre-stored in association with the game status and the position of the lever by referring to the storage unit 403 (step S509), reproduces the acquired audio information (step S510), performs other game processes (step S511), and returns to step S501. Accordingly, the CPU 101 functions as the audio unit 409 in cooperation with the audio processing unit 110.

According to the present embodiment, it is possible to give the player a feeling that the player drives a real vehicle, by using the gearlever-shaped controller and by controlling the repulsive force applied to the lever based on information sent from the gearlever-shaped controller regarding the position of the lever and an external force.

INDUSTRIAL APPLICABILITY

As explained above, according to the present invention, it is possible to provide a game apparatus and game method for controlling a repulsive force applied to a lever by using information regarding the position of the lever and an external force, and a program for realizing these on a computer.

Various embodiments and changes may be made there unto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-67828 filed on Mar. 13, 2003 and including specification, claims, drawings and summary. The disclosure of the above Japanese Patent Application is incorporated herein by reference in its entirety.

What is claimed is:

1. A game apparatus comprising:
  a connection unit that is communicably connected to a controller which has a lever that is guided along a pre-determined route, and which sends status information specifying a current position of the lever and receives instruction information specifying a repulsive force to be applied to the lever;

a storage unit that pre-stores repulsive force information specifying a repulsive force to be applied to a lever, in association with a game status and a position of a lever;

a reception unit that receives status information from said controller via said connection unit;

a generation unit that acquires the repulsive force information pre-stored in association with a current game status and a position of a lever specified by the received status information, and generates instruction information specifying a repulsive force specified by the acquired repulsive force information; and a sending unit that sends the instruction information generated by said generation unit to said controller via said connection unit, and wherein, the generation unit generates a random number and designates as the instruction information, a value obtained by heightening or lowering the repulsive force specified by the acquired repulsive force information with the generated random number, at every predefined interval.

2. The game apparatus according to claim 1, wherein said storage unit further pre-stores driving force information specifying a driving force, in association with a game status and a position of a lever, said game apparatus further comprising:

a calculation unit calculates acceleration of an object moving in a simulative world, based on a driving force specified by the driving force information pre-stored in association with a current game status and the position of the lever specified by the received status information; and wherein, a display unit moves the object in the simulative world at the calculated acceleration, and displays the object on a screen at a position reached by moving, at said every predefined interval.

3. The game apparatus according to claim 2, wherein:

said display unit displays on the screen, the virtual world as viewed from the position of the moved object.

4. The game apparatus according to claim 1 wherein said storage unit further pre-stores audio information in association with a game status and a position of a lever, said game apparatus further comprising:

an audio unit reproduces the audio information pre-stored in association with a current game status and the position of the lever specified by the received status information.

5. A game method comprising a receiving step, a generating step, and a sending step, and being intended for communications with a controller which has a lever that is guided along a predetermined route, and which sends status information specifying a current position of the lever and receives instruction information specifying a repulsive force to be applied to the lever, wherein:

in said receiving step, status information is received from said controller;

in said generating step, repulsive force information which is pre-stored in association with a current game status and a position of a lever specified by the received status information is acquired, and instruction information specifying a repulsive force specified by the acquired repulsive force information is generated; and in said sending step, the generated instruction information is sent to said controller, and wherein, in said generating step, a random number is generated cyclically and a value obtained by heightening or lowering the repulsive force specified by the acquired repulsive force information is designated with the generated random number as the instruction information, at every predefined interval.

6. A computer-readable information recording medium storing a program for controlling a computer having a connection unit communicably connected to a controller which has a lever that is guided along a predetermined route, and which sends status information specifying a current position of the lever and receives instruction information specifying a repulsive force to be applied to the lever, to function as a storage unit, a reception unit, a generation unit and a sending unit, wherein said program controls, in said computer:

said storage unit to pre-store repulsive force information specifying a repulsive force to be applied to a lever, in association with a game status and a position of a lever;

said reception unit to receive status information from said controller via said connection unit;

said generation unit to acquire the repulsive force information pre-stored in association with a current game status and a position of a lever specified by the received status information, and to generate instruction information specifying a repulsive force specified by the acquired repulsive force information; and said sending unit to send the generated instruction information to said controller via said connection unit, and wherein, said generation unit cyclically generates a random number and designates as the instruction information, a value obtained by heightening or lowering the repulsive force specified by the acquired repulsive force information with the generated random number, at every predefined interval.

* * * * *

UNITED STATES PATENT AND TRADEMARK OFFICE
CERTIFICATE OF CORRECTION

PATENT NO. : 7,601,064 B2　　　　　　　　　　　　　　　　　　　　　　　　　Page 1 of 1
APPLICATION NO. : 10/799452
DATED : October 13, 2009
INVENTOR(S) : Manabu Akita It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1205 days.

Signed and Sealed this

Fifth Day of October, 2010

David J. Kappos
*Director of the United States Patent and Trademark Office*